United States Patent [19]

Donald et al.

[11] Patent Number: 5,053,956
[45] Date of Patent: Oct. 1, 1991

[54] INTERACTIVE SYSTEM FOR RETAIL TRANSACTIONS

[75] Inventors: Gordon H. Donald, Clitheroe; Jeffrey L. Hewitt, Northwood, both of England

[73] Assignee: Coats Viyella, Manchester, England

[21] Appl. No.: 342,975

[22] Filed: Apr. 25, 1989

Related U.S. Application Data

[63] Continuation-in-part of Ser. No. 871,094, Jun. 5, 1986, abandoned.

[30] Foreign Application Priority Data

Jun. 17, 1985 [GB] United Kingdom ............... 8515323
Oct. 29, 1988 [GB] United Kingdom ............... 8825358

[51] Int. Cl.$^5$ ............................................. G06F 15/24
[52] U.S. Cl. ................................. 364/401; 364/403; 358/183
[58] Field of Search ....................... 364/401, 405, 403; 235/383; 358/181, 183

[56] References Cited

U.S. PATENT DOCUMENTS

| | | |
|---|---|---|
| 4,073,368 | 2/1978 | Mustapick . |
| 4,232,334 | 11/1980 | Dyson . |
| 4,261.012 | 4/1981 | Maloomian . |
| 4,305,131 | 12/1981 | Best ................................... 364/521 |
| 4,318,121 | 3/1982 | Taite et al. . |
| 4,329,710 | 5/1982 | Taylor . |
| 4,414,467 | 11/1983 | Gould et al. . |
| 4,467,349 | 8/1984 | Maloomian . |
| 4,486,774 | 12/1984 | Maloomian . |
| 4,567,359 | 1/1986 | Lockwood . |
| 4,644,401 | 2/1987 | Gaskins . |
| 4,700,181 | 10/1987 | Maine et al. . |

FOREIGN PATENT DOCUMENTS

| | | |
|---|---|---|
| 0019662 | 11/1979 | European Pat. Off. . |
| 0109189 | 10/1983 | European Pat. Off. . |
| 1388942 | 4/1972 | United Kingdom . |
| 2105075 | 5/1982 | United Kingdom . |

OTHER PUBLICATIONS

Chase, Rosen & Wallace, Inc. CASPIR users guide, pp. 1, 8-10, 12-13.

Allmendinger, Bette, Engler, Haeusser, and Muhlenbrock-IBM Technical Disclosure Bulletin, vol. 18, No. 8 Jan. 1976.

Yeazel, "Pioneering Perspective, Point of Purchase-The Decision to Buy", Optical Information Systems, vol. 6, No. 1, Jan./Feb. 1986, pp. 36-37.

"Retailers Beginning to Tune in Video Displays", Advertising Age vol. 56, No. 90, Nov. 1985.

Primary Examiner—Jerry Smith
Assistant Examiner—Allen M. Lo
Attorney, Agent, or Firm—Ralph W. Selitto, Jr.

[57] ABSTRACT

A system for retail trading comprises an image storing arrangement storing images of items being traded (e.g. carpets), an image index arrangement connected with the said storage arrangement and containing identifiers for the images therein, an image retrieval arrangement and display means (e.g. a video screen) for displaying retrieved images. A transaction data processing arrangement includes a data input arrangement by which the displayed image identifier is automatically input from the input arrangement. Composite images can be handled.

13 Claims, 3 Drawing Sheets

INTERACTIVE SYSTEM FOR RETAIL TRANSACTIONS

This application is a continuation-in-part of U.S. Application No. 871,094, filed June 5, 1986, of G.H. Donald and J.L. Hewitt, entitled "Retail Trading Systems", now abandoned. The latter application was also the subject matter of a British application, now issued as British Patent No. 2,177,245.

BACKGROUND TO THE INVENTION

This invention relates to retail trading systems.

The invention is particularly concerned with systems for trading large items that need to be delivered to rather than carried away by the customer, and items that may customized at least to some extent or fitted. An example is carpets, which are large and require fitting.

If a carpet retail outlet is to carry a comprehensive inventory of carpets, it must necessarily be housed in premises of some size, which, in a prime shopping area, would involve high rent and rates. It is usual therefore to site such premises out of town. Nevertheless, there are problems involved with the display of many carpets, and customers can find it daunting to select from extensive arrays of patterns, textures and colourways.

Moreover, the carrying of such a comprehensive stock as will at least permit inspection "in the piece" is itself an expensive business.

Accordingly, there is a tendency to sell carpet by sample. The retail premises need carry no or hardly any stock, and can be accommodated in more compact premises far less expensively, even on prime retail sites.

However, a disadvantage of this is that it is difficult for customers to appreciate, from a small sample, how a carpet will look in their room setting, and how it will relate to their furniture and other effects, for example. Sometimes photographs of a "typical" room are included in a pattern swatch.

Sale by sample involves, moreover, the preparation of a transaction record on the basis of a sample identifier—usually an alphanumeric code. The identifier is often on an adhesive ticket, and mistakes can arise through loss of or damage to, misreading or wrongly transcribing the identifier.

The present invention provides a system by which these disadvantages can be avoided.

SUMMARY OF THE INVENTION

The invention comprises a system for retail trading comprising an image storage arrangement storing images of items being traded, an image index arrangement connected with the said storage arrangement and containing identifiers for the images therein, an image retrieval arrangement and display means for displaying retrieved images, and a transaction data processing arrangement including a data input arrangement and by which the displayed image identifier is automatically input from the index arrangement.

Said image storage arrangement may comprise video disc means and said display means a video screen.

Said input arrangement may comprise an alphanumeric keyboard.

Said input arrangement may comprise a special function key operable to put the input arrangement into a transaction specifying mode in which the identifier for the currently displayed image is automatically input from the index arrangement into a transaction record.

Said input arrangement may comprise a special function key operable to put the input arrangement into an image retrieval mode.

The image index arrangement may contain a categorized image index, and the said retrieval arrangement may then be operable to retrieve images on a category basis, preferably, selectively, images falling into two or more categories. Such retrieved images may be automatically displayable sequentially.

The stored images may be composite images comprising a first image component generated from an item being traded and a second image component generated by computer software. The two components of the composite image may be held in different parts of the said image storage arrangement. The second component may comprise colourway information. The first image component may be associated with mask information limiting the displayed area of the second image component to the area not occupied by the first image component.

The system may also comprise colour input means connectable to said image retrieval arrangement and operable to cause said image retrieval arrangement to select only images having colourways related to a colour input via said colour input means.

The system may also be operable to display price and/or availability information with a selected image.

The system may have means for connection to a remote station for transmission of transaction information to said remote station and transmission of price and/or availability information from said station.

The invention comprises an interactive video system for retailing merchandise comprising:
- a database containing data relating to said merchandise;
- an image store storing images of said merchandise;
- image retrieval and display means for retrieving and displaying images from said image store; and
- a control arrangement interconnecting said database, said image store and said images retrieval and display means and having an operator input arrangement and an information output arrangement additional to said image display means.

The said information output arrangement may comprise a digitized voice reproducing arrangement, which may be under the control of the said control arrangement so as to output stored voice information relevant to an image being currently displayed.

The control arrangement may include a touch screen arrangement and the images include touch screen "keys". One of such "keys" may comprise a "voice repeat" key, touching which causes a section of voice information to repeated. Voice information may be divided into short complete messages and the control arrangement may then be inoperable to interrupt a message.

The system may have more than one input arrangement for control purposes. One input may comprise an alphanumeric keyboard. This is a relatively "user unfriendly" arrangement, however, if it has to be operable by customers, who may have no keyboard skills. However, it is a very flexible arrangement, so far as the scope of data and control input it can handle is concerned, and will be useful as a trained operator input arrangement.

One input may comprise a bar code reader and the system may include printed matter carrying visual information (which may be words and/or pictures) representative of sections of the database and image store and bar codes coding for such sections whereby such sections can be accessed by the bar code reader. Such an arrangement can be useful for selecting categories of merchandise, for example design styles (e.g. in a furniture context, Victorian, contemporary and so on) or materials or bedroom furniture, lounge furniture and so on. A bar code adjacent a picture or verbal description of a category can move the image pointer to the beginning of a sequence relating to that category.

Such printed matter may comprise cards, and the bar code reader may then comprise a swipe reader. Such printed matter may, however, comprise books, brochures, catalogues and the like which cannot be "swiped" and the bar code reader may then be of the wand type. Both kinds may, of course, be provided in the same system.

One input may comprise a "smart card" reader. Such a device may be operable to handle transaction data from customers' cards. It may also be operable to handle retail staff operator training (whether in aspects of the interactive video system or otherwise) by for example keying the system into operator training mode and recording in the "smart card" memory details of training successfully completed for a particular operator and from such details, to activate the system to begin a new training session having regard to the recoded data on training successfully completed.

Of course, one input can comprise a magnetic card swipe reader for handling regular credit card transactions.

The system may also comprise recorder means for recording details of a retailing session. Such recorder means may comprise a video cassette recorder and the control arrangement may include a "session" memory in which image pointers are stored during a session for recall at the end of a session to rerun the program for input to the recorder means. In this way, the images a customer has seen together, of course, with the associated text and voice data, can be recorded for review on a separate, e.g. domestic video cassette recorder.

The system may also comprise cash till means, which may be part of the transaction data processing arrangement described in U.S. Pat. No. 2,177,245 aforementioned.

The various measures referred to may be used individually or in any desired combination to enhance the effectiveness of the system and make it easier for untrained operators to retrieve information and associated images and carry out a transaction thereon with or without the help of a trained assistant.

BRIEF DESCRIPTION OF THE DRAWINGS

Embodiments of systems for retail transaction will now be described with reference to the accompanying drawings, in which.

DESCRIPTION OF THE PREFERRED EMBODIMENTS

The system for retail trading illustrated in the drawings comprises an image storage arrangement 11 storing images of items being traded such for example as carpets, furniture, clothing, household textiles, homewares and even motor vehicles. The image storage arrangement 11 may comprise a video disc arrangement of the kind, commercially available, that have controlled access to images stored thereon so that a single video frame can be addressed. A Phillips Laservision VP35 disc player is suitable.

The storage arrangement can also comprise a frame store 11a for storing image information in digital form for use in image processing applications, referred to below.

Figure 2:
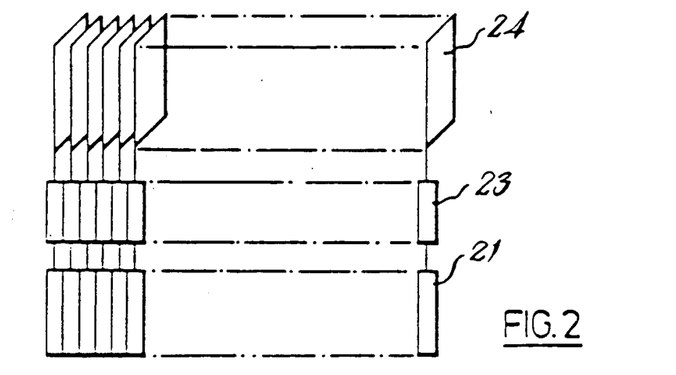
FIG. 2 is a diagrammatic representation of an image storage and indexing arrangement.

An image index arrangement 12, connected with the storage arrangement 11, contains identifiers—for example—alphanumeric codes 21 in digital form—in random access memory (FIG. 2) having common memory addresses 23 with the address of the individual images 24 in the image store 11.

Figure 1:
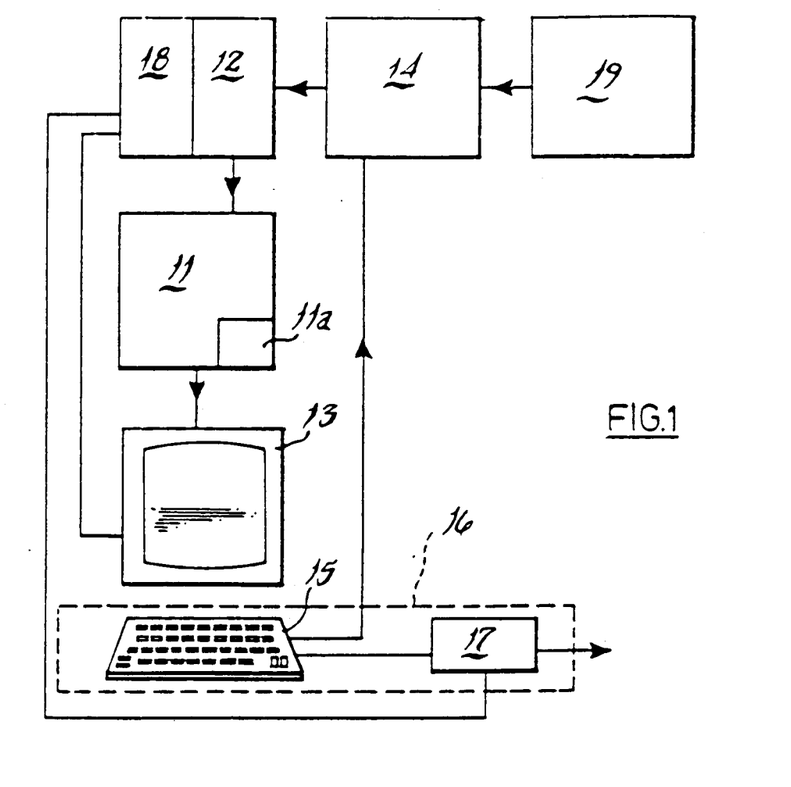
FIG. 1 is a diagrammatic representation of a system for retail transactions, e.g. selling carpets.

A video screen 13 receives video signals from the image store 11. Individual images/frames are retrieved from the index arrangement 12 by an image retrieval arrangement 14 controlled by signals from an input arrangement 15 comprising a standard alphanumeric keyboard which is part of a transaction data processing arrangement 16 which also includes a data output arrangement 17 which may comprise a printer or a visual display unit or a modem connecting the arrangement to a remote arrangement adapted to receive the data or simply a storage arrangement connectable to any of the above for subsequent interrogation.

Associated with the index arrangement 12 can also be a database 18 accessible in the same way and containing information on price and/or availability of items which images are stored in the image storage arrangement 11. Information from the database 18 can be called up to appear on the video screen 13, either superimposed on the video image or on a separate screen alternatable with the video image. A dedicated or special function key on the keyboard 15 can be used to call for (and cancel) the information display.

Likewise, a special function key on the keyboard 15 is operable to put the input arrangement 16 into a transaction specifying mode in which the identifier for the currently displayed image is automatically input from the index arrangement 12 into the output arrangement 17 as part of a transaction record. The remainder of the record—date, customer's name and address, number of items ordered, price, credit details, discount, method of payment, delivery date and so on—can be entered from the keyboard. More sophisticated programming can permit information from the database being available—say price—and operated on by standard operator s--- ay price multiplied by (keyboard input) number of items can given gross price, operated on in turn by a standard discounting arrangement (say 5% off for cash), or by a standard credit arrangement so as to add on a percentage interest and divide the total by twelve or twenty four to give a monthly payment.

Software for this transaction specifying mode of the input arrangement can be, with considerable user advantage, menu driven. The first menu might for example contain the following options:

Display details
Place Order

Selecting "Display details" (by whatever means is chosen, say by moving, using the keyboard space bar or line feed key, a cursor or selection device next to "Display details" on the screen) throws up on to the screen the details of price/availability held in the database 18, together with a prompt that might say "Press Cancel to exit". Selecting "Place order" can call up a series of prompts such as "Enter customer's name", "Enter customer's address", and "Enter amount required", as well as subsidiary menus such as Payment method:
Cash
Credit
Cheque
Credit card which might then have another menu called up, in the event "Credit card" is selected listing accepted cards.

The keyboard 15 also has a special function key putting it into an image selection mode. This may also be menu driven, the menus offering choices depending on the items being traded.

For selling carpets, a typical first menu might comprise a choice of price ranges, followed by a menu offering a choice of plain or pattered, another offering a choice of construction, another, pile type, and another colour.

Figure 3:
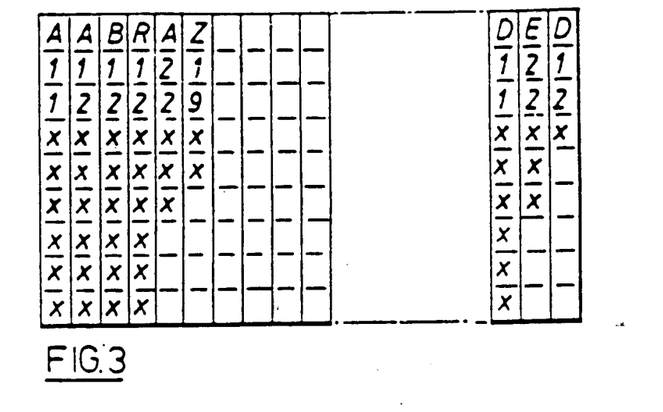
FIG. 3 is a diagrammatic illustration of an image retrieval arrangement operable to retrieve images on a category basis.

The identifier used in the index arrangement 12 may contain coding, as illustrated in FIG. 3 categorizing the items into the choice indicated above or such other choices as may be appropriate to whatever item is being traded. For example the first symbol in the identifier might indicate a price range, the second whether the carpet is plain (1) or patterned (2), the third the choice of construction (e.g. Wilton, Axminster, tufted, foambacked, etc) and so on.

The keyboard 15 might then, by pressing an appropriate key, be put into an automatic sequencing mode, in which all carpets conforming to the selection are displayed in sequence, a 'pause' key being available for taking a longer look than the automatic sequence allows (which might be just a few seconds for instance). Or the sequencing might be, at will, effected manually be pressing an "Advance" key. In any event, the selected image is displayed on the video screen 11 and the associated identifier made available to the transaction data processing arrangement 17 as well as the associated database information being made available both to the screen 13 and the processing arrangement 17.

The images stored in the storage arrangement can with advantage show the item against a background—a carpet, for example, can be shown in a room setting and the same carpet can be shown in different room settings to help the customer choose the ideal carpet, whether as to colourway, or size or nature of pattern, for his decorating scheme or furniture.

Each image can of course be complete in itself, so that to cover one carpet in ten different room settings, ten image frames are provided in the storage arrangement 11. Such ten image frames can be produced by imaging an actual carpet in ten different actual rooms. This will clearly produce visual images of high quality, but may be tedious and costly in practice.

Figure 4:
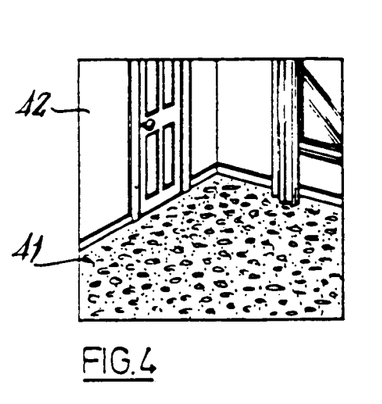
FIG. 4 is a representation of a composite of a retrieved image on a background.

The ten images may, on the other hand, be composite images, in which, for example, only the carpet is imaged from an actual carpet, the remainder of the image being computer generated, either from scratch or from an image of an actual room which has been imageprocessed so that for example the colours of the walls, ceiling and woodwork are false, and are different or in different combinations (or colourways) for each of the ten images. FIG. 4 is a representation of such a composite image where the carpet area 41 of the image, which is produced from a video picture of an actual carpet, is used together with a setting or background image component 42. A series of such images is produced with different false colour colourways for the background image component 42.

Figure 5:
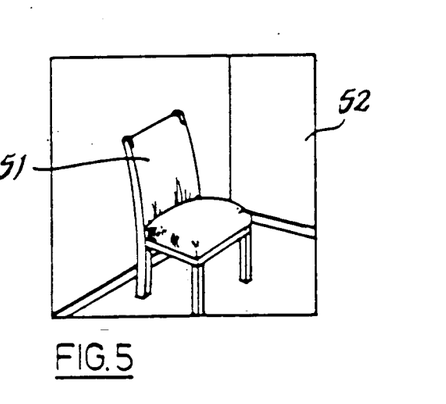
FIG. 5 is a representation of another composite image.
Figure 6:
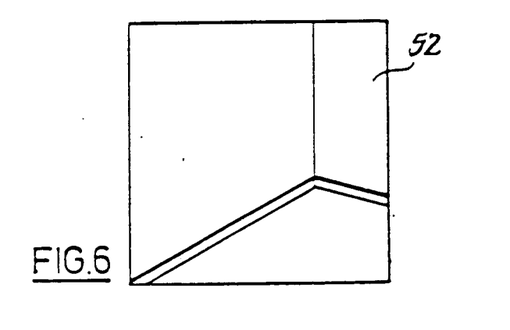
FIG. 6 is a representation of a component of the image shown in FIG. 5.

FIG. 5 shows another composite image in which an image 51—shot from actuality—of a chair is shown against a room background 52. FIG. 6 shows the background 52 only, which may be so simple as to be readily computer-generated without the need to realize the same in practice. The chair image 51 is accompanied by masking information which cancels the background component of the computer generated image, so as not to interfere with the real image component. In this way, differently shaped chairs or other articles can be shown against the same background, and the background may itself be changed as to colourway (among other things) so as to provide a series of composite images. The colourway information can be a part of the computer software and provide operators acting on a basic computer generated setting design to change the colourway. In this way, the provision of a selected twenty (say) channels is provided in software instead of requiring twenty separate video frames to be stored.

This could, alternatively, be a way of generating video frames for storage, which would reduce computation and hence access time. However, where the changing information in the screen is background information, it may be desirable first to locate the item being traded and then to apply software to change the background through a sequence of colours.

A colour sensor 19 (FIG. 1) can be used to select retrieved frames to a colour of a sample, perhaps a favorite curtain material or piece of furniture, proffered for its examination by an intending purchaser. Instead of actually bringing in a sample (which might be difficult in the case of a large item of furniture) a colour matching card can be supplied to be compared with the original and brought in instead for examination. The colour sensed can then be translated into an appropriate colour code and used instead of a keyboard input to select a colour category.

The invention is not to be limited to the precise details described and illustrated. The video screen 13 could, for example, be replaced by any other suitable display arrangement such for example as a slide projector.

Another embodiment of a system for retail transactions will now be described having peripheral devices under the system's control for facilitating interactive operation by users of the system.

Figure 7:
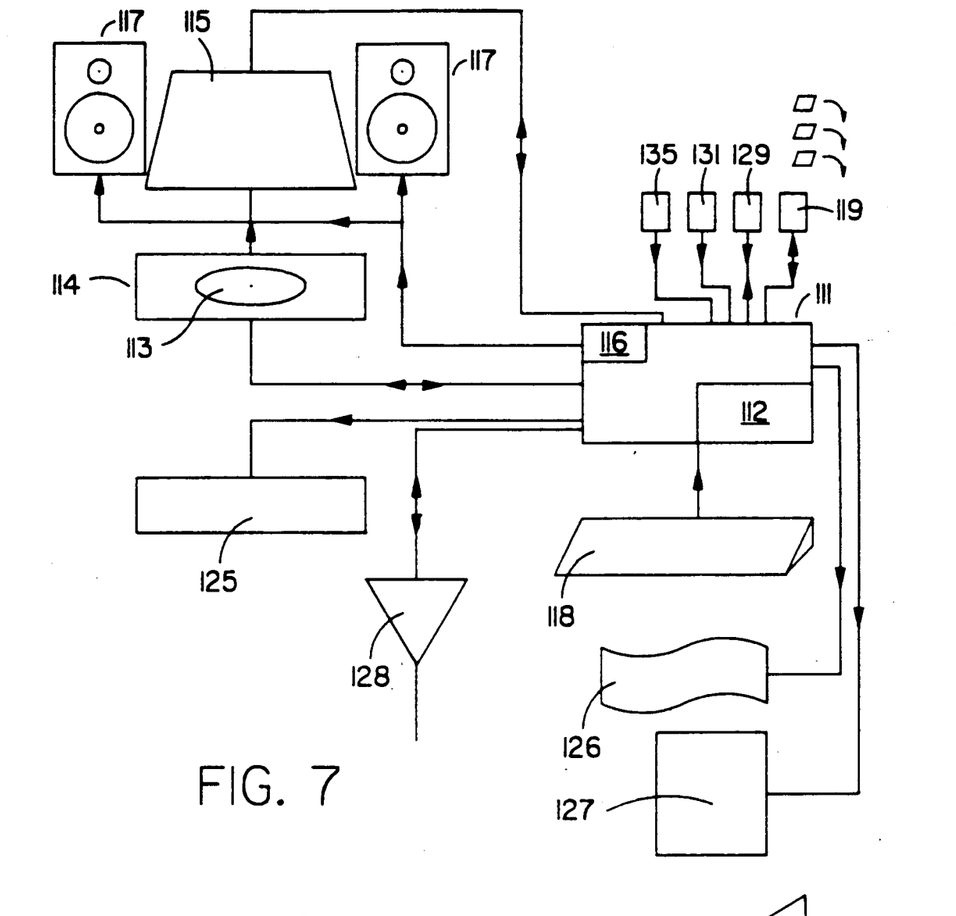
FIG. 7 is a diagrammatic representation of another system embodiment of the invention having audio and visual components for interactive operation.

The system illustrated in FIG. 7 comprises a computer 111 including a high capacity disc store 112 which contains, inter alia, a database containing data relating to merchandise being marketed, and an image store, namely a video disc 113 storing images of said merchandise.

Thus the video disc 113 may contain images of furniture and furnishings in a range being marketed from a retail establishment, and the database may comprise data relating to such images for example available colours or colourways, stock numbers, quantities in stock, where the stock is held, price, manufacturer, available options and so on.

The system also comprises image retrieval and display means for retrieving and displaying images from the video disc 113, namely video disc player 114 controlled by signals from the computer 111 serving video screen 115.

The computer 111 comprises a control arrangement which interconnects said database, said image store and said image retrieval and display means so that images can be retrieved and displayed and information from the database retrieved for association with the retrieved and displayed images. Such association may take several forms, as will be hereinafter further explained.

The control arrangement, which is to say, the computer 111, has an operator input arrangement comprising various elements as will be hereinafter further explained. It also has an information output arrangement additional to said image display means.

Such additional information output arrangement comprises in this embodiment a digitized voice reproducing arrangement. The digitized voice information is stored as digital data in the computer hard disc memory 112 and reproduced via a digital-to-analogue converter 116 in the computer 111 as stereo audio signals passed to speakers 117.

The voice information can comprise instructions guiding an operator in the use of the system. Thus the voice information may comprise a request associated with a touch screen display to touch a "key" area on the screen to secure a desired result, for example to cause the system to enter one of a number of different modes of operation or to select a given category of images, or it might comprise a description of the displayed image or a recital of factual data concerning the same such as prices, availability and so on.

A primary "user friendly" operator input to the system is a touch screen arrangement. Such an arrangement, illustrated in FIG. 8, comprises arrays of sensors 121 along adjacent sides of the screen 122. Touching the screen 115 interrupts light falling on some of the sensors from emitters on the opposite sides of the screen 122. "Key" areas are located on the screen by computer-generated graphics arrangements built into the system, and these key areas include verbal or other indications. A screen may include one or more such key areas. As illustrated, touching key area 122 will interrupt light to sensors 121 on the adjacent sides of the screen 122 contained within the compass of the brackets 123. Touching a different key area 124 will affect other sensors, and the computer will recognize which of the key areas has been touched by sensing which sensors 121 have been blocked.

Figure 8:
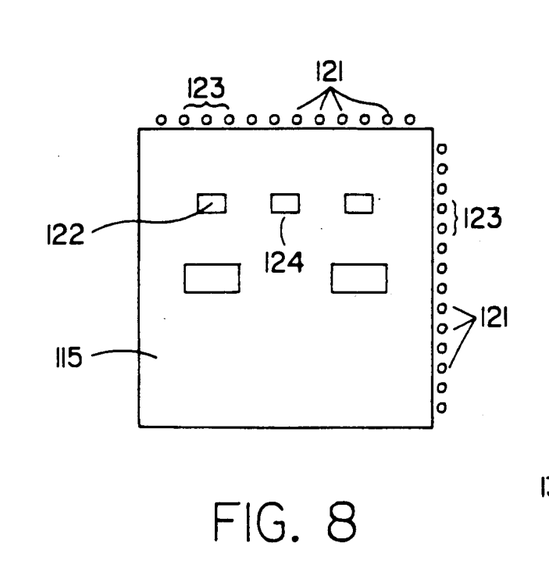
FIG. 8 is a depiction of a typical "touch screen" image in the system of FIG. 7.

Thus a plurality of key areas 122, 124 and so on can constitute a menu from which items may be selected by touching the screen. A single key area can permit an image sequence to be stepped through.

A "secret" key area, i.e. one not disclosed on the screen but of which its location is known to a trained operator can be used for special trained operator procedures, such, for example, as rapidly restoring the system to an initial state. A special key area can be displayed during an initial part of a session by which "subtitles" copying or summarizing voice information can be displayed for the hard-of-hearing.

One key may control a "voice repeat" function in which voice information about a displayed image can be repeated. Voice information can be divided into sections each comprising a short, but complete, message, such, for example, as "The bedspread is offered in a choice of colours, white, red, blue, green and yellow."

It may be desired to arrange that such messages are not interrupted by an input command, e.g. via the touch screen arrangement, but are played out. Each such message may have an end marker that releases an electronic latch arrangement which vetos any touch screen-entered command for so long as the end marker has not been reached. Such message completion arrangements may add realism to the system, by avoiding premature interruption of the current voice message, which would not usually happen in practice in a conversation between purchaser and salesman. The present system embodiment quite realistically mimics such a conversation, with the customer's end of it being effect not by speech but by the simple technique of selecting touch screen options by pointing to them.

Other operator inputs and system outputs are used for other communication purposes.

A primary operator input is a conventional keyboard 18 which can be used for a multiplicity of purposes including initial program and data loading and modification. Such purposes would normally be within the realm of trained operators and system supervisors and this important input would not normally be available to retail customers, not all or even many of whom could be expected to have keyboard skills, so that it would constitute a relatively slow method of communication.

Figure 9:
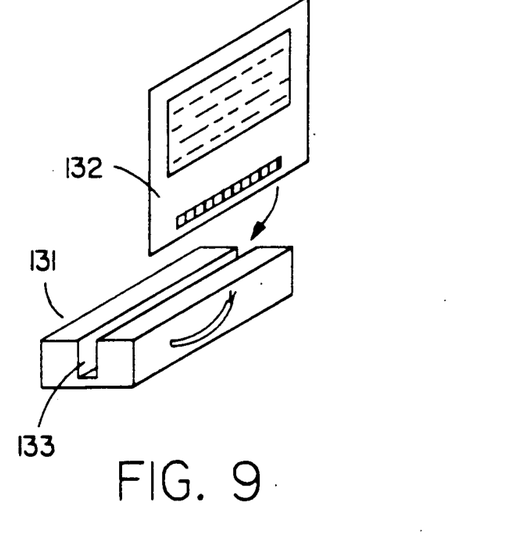
FIG. 9 is an illustration of a bar code reader for reading a swipe card presented by the system user.

Another input comprises bar code reader means, and these can be of two types. A first, 131 (FIG. 9), is a swipe reader in which a card 132 bearing a suitably placed bar code 133 is "swiped" through a slot 134. The card 123 contains printed matter in the form of text or pictorial matter and the system can involve a set of cards which may be suitable indexed or just browsed through in order for the customer to select a particular category of merchandise. The relevant card chosen is swiped through the reader 131 in order to instruct the system to display images and related matter pertinent to that selection.

Another type of bar code reader is an optical wand 125 (FIG. 8) which can be used to read bar codes printed in books, catalogues and the like that cannot be "swiped"—otherwise, the operation is similar.

Another input arrangement is a magnetic card reader 129 which can handle Access and like cards for billing purposes.

Another type of input, which also involves a system output, is a "smart card" reader 119. "Smart cards" are essentially portable electronic memories which can be credit card size that can be read and written into. In one such commercially available arrangement a smart card reader is simply a small box, connected to the computer, into which a smart card can be placed and is then immediately in communication with the computer. The card may comprise an electronic "key" which can be first of all interrogated electromagnetically upon the card reader's sensing the presence of a smart card to identify the card. According to the coding of the "key" the computer may then switch the system to one or another mode of operation.

A smart card may be issued to a customer and placed on the card reader 119 at the beginning of a session. The customer is at once identified to the computer, the card containing details of the customer's name, address, telephone number, credit rating and any other details that may be pertinent. The card may for example contain account details and be involved in transaction data processing in which, as a result of the session, the customer purchases an item or items of merchandise and the amount of a credit balance contained within the information stored in the card is depleted in accordance with the value of the transaction. The card may also enable the computer 111 to be put into direct contact with a customer's bank account, via a modem to be discussed below automatically to transfer the appropriate funds therefrom into the retail establishment's own account.

Another way in which "smart cards" can be used is in the training of retail personnel both to operate the system and assist customers and in product knowledge. A retail assistant can be assigned a personal "smart card" which will place the system into "training" mode and call up training exercises—using the screen, voice, touch screen and other outputs and the touch screen, keyboard and other inputs—and keep a log, on the "smart card", of such exercises successfully completed so that another training session will begin with fresh exercises.

Another feature of the system is a video cassette recorder which can be used to prepare a video tape of a retailing session. The various pointers actuated by touch screen or other entries during a session are stored in the computer 111 memory and are available, if required, to re-run the sequences of images and data retrieval called up during the session and transfers the images and associated voice and other outputs as appropriate to the video tape. A customer can take this tape away to review it on a domestic VCR possibly to assess the appropriateness of furnishing fabrics, carpets and like merchandise in the domestic setting, possibly to consult with other family members before confirming a purchase.

A printer 126 can be used to output pricing and size information which is stored in the databank relative to a selected product and also to print transaction details. The printer 126 can of course have a wide range of usefulness—it can be used also to print out stock levels for stock control purposes and details of locations where stocks are held and indeed any information which is held in or acquired by the computer 111.

Cash till means 127 are also connected to the computer 111 for handling cash and cheque transactions.

As in the earlier patent above referred to a modem 128 connects the computer 111 to the outside world and can integrate the system with like systems in other retail establishments and with a computer in a central supervisory office which can control a master databank and operate a centralized accounting and stock control function.

The computer 111 can of course be programmed to operate a stock control system by subtracting items sold from stock lists and comparing residual stock with prescribed re-order levels to warn when stock should be re-ordered or even to prepare and mail out (possibly by "electronic mail" via the modem) orders for depleted stock replenishment. A network of retail outlets can be regarded, for selected stock items for which there is, perhaps, infrequent demand, as a single stock holding unit so that it is not necessary to maintain such stock at all the retail outlets, merely hold information as to which outlet or outlets of the network hold such stock.

It is, of course, not necessary for any stock to be held at all at the retail establishment, since customer selection can be effected entirely through the medium of the system. Via the modem, details of a completed transaction can be sent to a warehouse to initiate dispatch of goods to the customer's address or even to a factory so that the goods (e.g. carpets) can in fact be manufactured.

This concept can be further extended to situations where permanently installed equipment may be impracticable by the use of portable equipment which can be carried by travelling salesmen accessing a central computer via a modem a customer's premises.

Instead of touch screen techniques, the screen could carry "keys" numbered 0 through 9 corresponding to the buttons on a telephone key pad and such may be used while the telephone is connected to the remote system to indicate customer choice and control the system.

Spreadsheet type programs can also be incorporated enabling calculations e.g. of room size, wallpaper and paint requirements and price the total quantities required and ordered.

Of course, especially in the field of home furnishing, but also in other fields, as described in British Patent No. 2,177,245, images generated directly from merchandise (or perhaps indirectly from pictures e.g. photographs and drawings of merchandise) e.g. by a rostrum camera, can be electronically manipulated and conjoined with images generated by computer programming and graphics, so as to be able to compile a room setting from picture fragments and substitute different wallpaper patterns and colourings with curtain and blind material, carpets, furnishings and so on and to be able to rearrange the disposition of furniture in a room and view it from different perspectives. The database can, for example, include electronically manipulable line drawings of room outlines which can be filled in with rostrum camera generated picture fragments from wallpaper, carpet and so on originals, selections being made from among those available on the video disc until a desired effect is achieved. In accordance with the previous patent, data corresponding to a final selection is input from the databank automatically to generate a customer order (and possibly as mentioned transmit the same to a warehouse or factory).

We claim:

1. A system for retail transactions comprising:
   computer control means for controlling a plurality of interconnected elements of said system;
   video display means connected to said computer control means having an output display area for displaying a composite display image including an object-image of a selected salable object superimposed on a background-image of a selected background scene;
   an object-image storage means connected to said computer control means for storing a plurality of object-image frames each of which contains a photographic or video image of a respective salable object, wherein each object-image frame is categorized with other related object-image frames according to at least one category of sales characteristic, wherein each object-image frame is designated by an individual object-image address, and wherein said object-image storage means under control of said computer control means provides an output of a selected object-image frame to said video display means in response to a corresponding object-image address input generated by said computer control means;

a background-image storage means connected to said computer control means for storing a plurality of background-image frames each of which contains an image representation of a respective background scene, wherein each background-image frame is selectable by an individual background-image address, and wherein said background-image storage means under control of said computer control means provides an output of a selected background-image frame to said video display means in response to a corresponding background-image address input generated by said computer control means;

indexing means of said computer control means connected to said object-image storage means and said background-image storage means for generating a respective object-image address and background-image frame address thereto in response to receipt of an object-image index code and background-image index code, respectively, thereby causing the corresponding object-image to be displayed on said video display means superimposed on the selected background-image;

input means connected to said computer control means including a keyboard for entering a category code designating a selected category of salable objects categorized by a common sales characteristic to be displayed in sequence on said video display means, and a background-image index code designating a selected background scene on which salable objects in the selected category are to be displayed; and image retrieval means of said computer control means for receiving the category code from said input means and for generating and outputting to said indexing means a series of object-image index codes for each of the salable objects in the selected category, and for receiving the background-image index code entered from said input means and outputting it to said indexing means, whereby the object-image of each salable object in the selected category is displayed on said video display means in sequence superimposed on the selected background scene.

2. A system according to claim 1, further comprising:

processing means of said computer control means connected to said input means for receiving a mode selection input entered on said input means and for operating said system in a selected one of a plurality of modes, including a data display mode in which data corresponding to a salable object is selected by input to said keyboard for display in conjunction with a displayed salable object; and image generating means connected to said processing means, said indexing means, and said video display means for generating a graphic image of the corresponding data and displaying it on said video display means.

3. A system according to claim 2, wherein said processing means includes a color selection mode in which the object-image of the salable object is displayed with a selected color superimposed thereon in response to a color selection input on said keyboard.

4. A system according to claim 2, wherein said processing means further includes a transaction data processing mode, wherein the index codes for a selected object and the corresponding data displayed on said video display means are used for processing a transaction to purchase the object.

5. A system according to claim 2, further comprising a color sensor, connected to said processing means, for scanning an external sample and detecting its color and providing a color selection input to said processing means such that the detected color is displayed superimposed on the displayed object-image of the salable object.

6. An interactive system for retail transactions comprising:

computer control means for controlling a plurality of interconnected elements of said system;

video display means connected to said computer control means having an output display area for displaying an image of a selected salable object;

database storage means connected to said computer control means for storing merchandising data relating to respective salable objects;

image storage means connected to said computer control means for storing image frames corresponding to respective salable objects;

said computer control means being connected to said database storage means and said image storage means for retrieving and processing the merchandising data relating to a selected salable object, and for retrieving and displaying the image frame corresponding to the selected salable object on said video display means in response to a user's transaction request input;

input means connected to said computer control means for entry of transaction request a input by a user, said input means including at least one interactive device for providing a prompt output to the user, said prompt output being related to the selected salable object based upon the processed merchandising data related thereto and processed by said computer control means, and for receiving a response input from the user, said response input being related to the selected salable object utilized by said computer control means to further process the merchandising data; and video cassette recording means connected to said computer control means for recording a retail transaction on video tape, whereby said retail transaction is processed by said system interactively with the user through a controlled sequence of interactive prompts and responses.

7. An interactive system according to claim 6, wherein said interactive device is a touch screen.

8. An interactive system according to claim 6, wherein said interactive device includes a digitized voice device and an audio output.

9. An interactive system according to claim 6, wherein said input means includes a data reader for reading a data-carrier containing transaction request input related to a salable object.

10. An interactive system according to claim 9, wherein said data reader is a bar code reader wand.

11. An interactive system according to claim 9, wherein said data reader is a magnetic card stripe reader.

12. An interactive system according to claim 9, wherein said data reader is an IC smartcard reader.

13. An interactive system according to claim 6, further comprising a modem connected to said computer control means for electronic transfer of transaction data to and from remote components of said system.

* * * * *